Nov. 3, 1959     J. F. PATTON     2,910,779
VERNIER HEIGHT AND DEPTH GAUGE
Filed Sept. 20, 1957
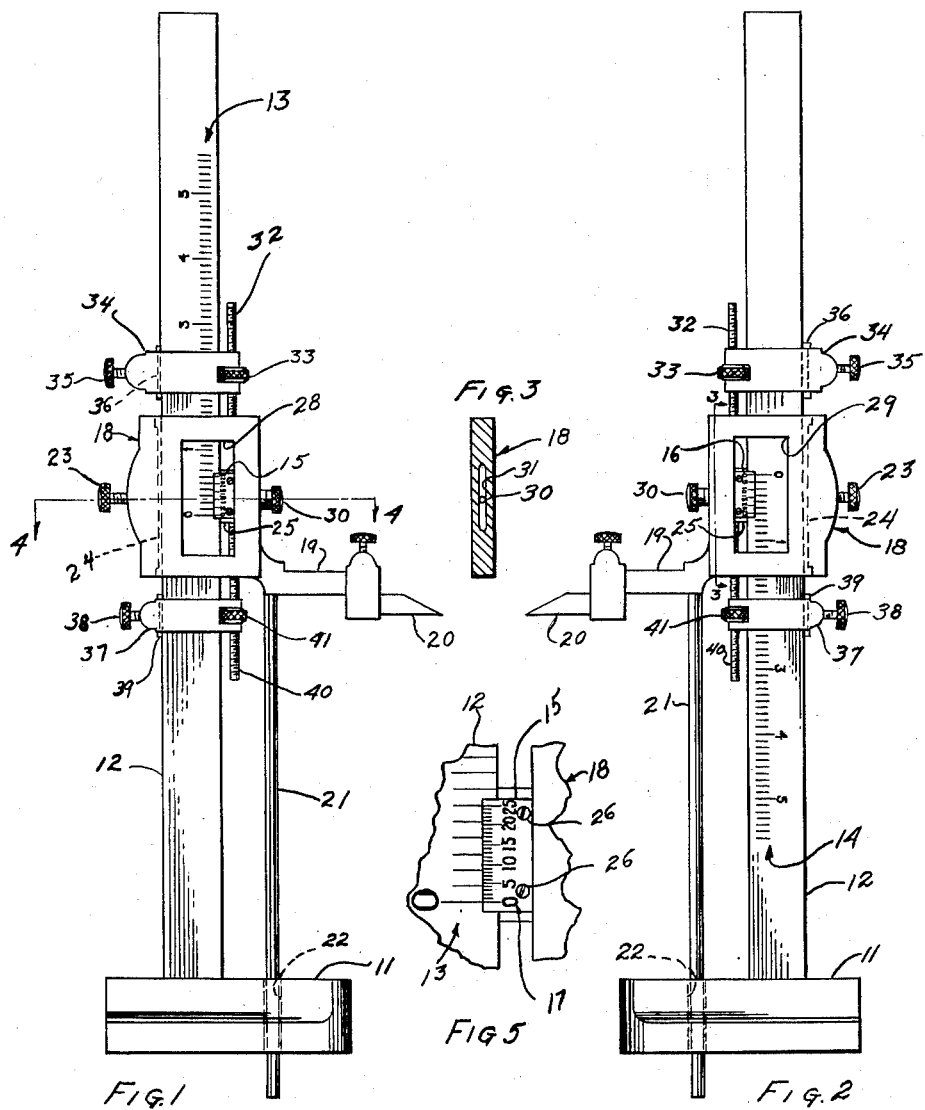
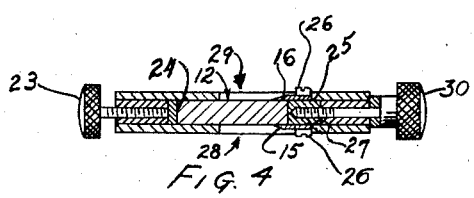
INVENTOR
JOHN F. PATTON
BY
ATTORNEY

United States Patent Office 2,910,779
Patented Nov. 3, 1959

2,910,779

VERNIER HEIGHT AND DEPTH GAUGE

John F. Patton, Toledo, Ohio

Application September 20, 1957, Serial No. 685,288

1 Claim. (Cl. 33—170)

This invention relates to vernier height and depth gauges, and more particularly to a vernier height and depth gauge particularly adapted for laying out and checking work such as that performed in a tool room or pattern shop.

In laying out a block of metal to be machined with various contours, shapes, holes and other configurations, the tool maker works from a drawing of the part upon which the designing engineer has placed reference lines. These reference lines indicate the distances between a datum or base line and the points on the block which are to be machined. For example, a reference line may be drawn through the center of a hole which is to be drilled in the block and a dimension, say 1.129", placed upon the print indicating that the center line of that hole is 1.129" above or below the datum or base line as the case might be. Where the part to be machined is complex, there will be a large number of similar reference lines, each of them being indicated as being located a specified number of inches and thousandths of inches away from the datum or base line.

The conventional height or depth gauge which is used for layouts of this kind has a scale starting at zero at the bottom of the vertical beam or post of the scale. The tool maker places the block of metal upon which the layout is to be made upon his bench or surface plate or upon an angle block. With the block of metal thus positioned, the tool maker uses the height gauge or depth gauge to locate either the main datum or base line, or, if he prefers, any one of the other reference lines. To the reading on the scale of the gauge at which this first line is located, he can then add or subtract the various dimensions indicated on the print. For example, the datum or base line might be so located on the print that when the block is positioned adjacent the height gauge, the scale on the height gauge reads 4.178". If it is then necessary to lay out a reference line .659" above the datum line, the tool maker must total these two figures and then move the height gauge until its scale reads 4.837" so that he can scribe this particular reference line. If the reference line is beneath the datum line he must subtract the one from the other and, if his arithmetic is accurate, move the gauge index to the figure 3.519". A similar arithmetic calculation must be made for each reference line to be drawn. Because base or datum lines are frequently located at the center of the drawing, the tool maker finds it necessary to both add and subtract odd numbers of thousandths of inches to and from the reading which he finds on the scale when the index is set at the datum or base level. Because of the numerous arithmetic calculations which must be made, both adding and subtracting the odd numbers involved, it is easy for a tool maker to make errors and, therefore, to lay out reference lines which are incorrectly positioned.

It is the principal object of this invention to provide a vernier height and depth gauge so designed as to facilitate the rapid positioning of the index at the center of a block to be machined and also providing for the direct reading of dimensions on both sides of the datum or base line, i.e., both above it and below it, directly in dimensions the same as those shown on the print. A gauge according to the invention, therefore, eliminates all arithmetical calculations and the tool maker directly reads any dimension shown on the print on the scale of the gauge.

It is a further object of this invention to provide a vernier height and depth gauge adapted also for the direct measurement of the location of reference positions above and below a datum or base line without the necessity for arithmetic calculations.

These and more specific objects and advantages will be better understood from the specification which follows and from the drawings, in which—

Figure 1 is a front view in elevation of a vernier height and depth gauge embodying the invention;

Figure 2 is a view similar to Figure 1 but taken from the back side of the gauge shown in Figure 1;

Figure 3 is a vertical sectional view taken along the line 3—3 of Figure 2;

Figure 4 is an enlarged horizontal sectional view taken along the line 4—4 of Figure 1, and Figure 5 is a fragmentary view on a greatly enlarged scale of a portion of a scale with which a gauge embodying the invention is provided and of the indicia on a vernier usable therewith.

A vernier height and depth gauge embodying the invention comprises, among other parts, a base 11 and a vertical beam 12. As will be seen by comparing Figs. 1 and 2, the beam 12 bears two sets of indicia. A first scale, generally indicated by reference number 13, reads upwardly from zero, and a second scale, generally indicated by reference number 14 in Fig. 2, reads downwardly from zero. The zero indicia of the two scales 13 and 14 are not opposite each other on the beam 12 but are offset vertically a distance equal to the length of the scales on one of a pair of verniers 15 and 16. The vernier 15 cooperates with the scale 13 and its indicia read upwardly from zero while the vernier 16 cooperates with the scale 14 and its indicia read downwardly from zero.

The particular sets of scales 13 and 14 and the indicia shown on the verniers 15 and 16 of the illustrative embodiment of the invention shown in the drawings, are arranged on an inch, .1 inch and .025 inch basis. As can be seen by reference to Figure 5, the indicia in the scale 13 have major lines at .1" intervals and subdivisional lines at .025" intervals. A scale 17 on the vernier 15 represents .025" in total and thus is usable for making fine adjustments between the sub-divisional lines on the scale 13 in a conventional manner. The indicia in the scale 14 and the indicia borne by the vernier 16 are similarly arranged except that they extend downwardly from the zero position in both cases.

An index slide, generally indicated at 18, is slidingly mounted on the beam 12 and has a horizontal index arm 19 on the outer end of which there is removably clamped an index 20. The arm 19 also supports a depth rod 21, whose purpose will later be described. The depth rod 21 is also an index and is threaded into the arm 19, protruding downwardly through a hole 22 in the base 11. The slide 18 is clamped in position on the beam 12 by a slide locking screw 23 threaded into the back side of the slide 18 and bearing against a gib 24.

The two verniers 15 and 16 (Fig. 4) are fixed on opposite sides of a vernier block 25 by screws 26. The block 25 slides in a way 27 in the inner face of one side of the slide 18. The lips of the two verniers 15 and 16 embrace an edge of the beam 12. The verniers 15 and 16 and a portion of each of the scales 13 and 14 with which they cooperate, are visible through window openings 28 and 29, respectively, at the front and back of the slide 18. The vernier block 25 may be locked in position relative to the slide 18 by a vernier locking screw 30 which extends through a vertical slot 31 cut in the arm of the slide 18 and is threaded into the vernier block 25.

A slide adjustment screw 32 is fixed in the slide 18 and extends upwardly therefrom parallel to the beam 12. A knurled nut 33 is engaged with the screw 32 and positioned between spaced arms of a slide adjustment block 34 which is vertically slidable on the beam 12. The slide adjustment block 34 may be locked in position on the beam 12 by a locking screw 35 threaded through a portion of the block 34 and bearing against a gib 36 to clamp the gib 36 against one edge of the beam 12.

A vernier adjustment block 37 is slidingly mounted on the beam 12 beneath the slide 18 and may be locked in position on the beam 12 by a locking screw 38 which is threaded through a portion of the block 37 and bears against a gib 39 to clamp the gib 39 against an edge of the beam 12. A vernier adjustment screw 40 is positioned in and depends from the vernier block 25 extending downwardly parallel to the beam 12 and through an opening (not shown) in the lower portion of the slide 18. A vernier adjustment nut 41 is engaged with the screw 40 and is positioned between arms of the vernier adjustment block 37.

The slide adjustment block 34 and the slide adjustment screw 32 are utilized for fine movement of the index slide 18. This is achieved by tightening the slide adjustment block locking screw 35, loosening the index slide locking screw 23 and rotating the nut 33 on the slide adjustment screw 32.

Similarly, the vernier adjustment block 37 and vernier adjustment screw 40 are utilized for adjusting the position of the verniers 15 and 16 relative to the slide block 18. This is done by locking the slide 18 in place, tightening the vernier adjustment block locking screw 38 and then rotating the vernier adjustment nut 41 on the vernier adjustment screw 40.

*Operation*

Assuming that the block of metal upon which reference lines are to be scribed (called the "work block" hereafter) has a vertical dimension of 4.0", the reference lines are located with respect to the datum or base line by carrying out the following steps. The verniers 15 and 16 are moved to the approximate center of the windows 28 and 29 of the slide 18 and clamped in place by tightening the screw 30. The slide 18 is raised to a point so that the zero indicium on the vernier 16 is located approximately at the 2" indicium of the scale 13. The work block is positioned on an angle plate so that its top is close to the tip of the index 20. The slide adjustment block 34 is locked in position by tightening the thumb screw 35. The index 20 is brought to precise positioning at the top of the work block through the use of the slide adjustment nut 33 and the slide 18 is clamped in that position by tightening the slide clamping screw 23. The index 20 now points precisely at the upper edge of the 4" work block.

The vernier 15 is now brought into play, its clamping screw 30 is loosened and the vernier adjustment block 37 fixed in place by tightening its clamping screw 38. The position of the vernier 15 is adjusted by rotating its adjusting nut 41 until the zero indicium on its scale aligns with the 2.0" reading of the scale 13. The verniers 15 and 16 are locked in this position by tightening the vernier block locking screw 30. This adjusted position of the verniers 15 and 16 relative to the index slide 18 is not changed during subsequent layout steps.

The locking screws 23, 35 and 38 are then loosened and the entire slide structure 18 with the adjustment blocks 34 and 37 is moved downwardly until the zero indicium on the vernier 15 is approximately aligned with the zero indicium on the scale 13. The slide adjustment block 34 is then locked in place by tightening its locking screw 35 and the adjustment nut 33 turned to bring the zero indicium on the vernier 15 into precise alignment with the zero indicium of the scale 13. Rotating the adjustment nut 33 under these conditions moves the entire slide 18 and the verniers 15 and 16 with the slide 18. The gauge is now set with the index 20 located precisely at the center line of the 4" block of metal and the two verniers 15 and 16 are aligned at zero reading with the two scales 13 and 14 reading upwardly and downwardly from zero, respectively.

The person making the layout now refers to the print and finds, for example, that he must lay out a reference line which is located .369" above the datum or base line. Where the distance to be measured is less than the distance enclosed within the windows 28 and 29, the slide 18 and index 20 may be moved to the position by loosening the slide clamping screw 23 and either one of the adjustment block clamping screws 35 or 38 leaving the other one of the adjustment blocks 34 or 37 locked in place. The slide 18 and its index 20 are moved upwardly in this case by rotating that one of the adjustment screws 33 or 41 which is mounted in that one of the adjustment blocks 34 or 37 which is left clamped in place. When the distance to be measured is greater than the distance visible through the window 28 or 29, all three of the locking screws 23, 35 and 38 are loosened and the slide 18 and two adjustment blocks 34 and 37 are manually moved up to approximately the distance desired. Again one of the adjustment blocks 34 or 37 is locked in place and the slide moved to the fine indication by rotation of the associated one of the adjustment nuts 33 and 41 until the precise measurement is read by the use of the vernier 15. It is preferable always to move the slide 18 by means of the slide adjustment screw 32 because this obviates any inadvertent change of relative position of the slide 18 and verniers 15 and 16 which might result if the vernier adjustment screw 40 were employed.

When it is desired to measure distances below the datum or base line, the gauge is reversed so that the operator reads the indicia of the scale 14 and measures downwardly from zero, i.e., downwardly from the datum or base line. Major movements of the slide 18 are manually made and fine adjustments are made through either of the two adjusting nuts 33 and 41. It will be remembered that since the vernier locking screw 30 is tightly clamped into position, rotation of the vernier adjustment nut 41 effectively moves the slide 18 in a manner identical with the movement of the slide 18 by rotation of the nut 33.

The depth rod 21 and other similar depth rods of different lengths are removably threaded at their upper ends into a threaded socket (not shown) in the underside of the index arm 19. These depth rods 21 and others are utilized as indexes for the measurement or location of reference lines in pockets such as molds or other hollow, upwardly open cavities. In laying out reference lines in such a cavity or in measuring the distances to portions of such a cavity, a depth gauge embodying the invention is positioned over the cavity upon suitable parallels. After selecting the depth rod 21 to be employed, the gauge is set to zero with the lower end of the depth rod 21 located at the datum or base line. Measurements above and below the datum or base line are then made directly by reading the upwardly or downwardly extending scales 13 and 14, respectively.

The combination of adjustment and locking mechanisms described above with the upwardly and downwardly reading scales 13 and 14 provides a depth and height gauge by which conventional arithmetical calculations of distances of movement of the gauge index are entirely eliminated. A gauge embodying the invention thus enables the layout or checking operator to measure directly, reading figures directly from the print which is being followed without requiring the numerous additions and subtractions which are necessary where using conventional gauges.

I claim:

A vernier height gauge comprising, in combination, a vertical beam, an index slide movable on said beam, an index carried by said slide, means for clamping said slide in position on said beam, only one vernier vertically movable in said slide, a pair of oppositely reading scales on said beam, the zero indicia for both of said scales being at the vertical center of said beam and said scales being on opposite sides thereof, said vernier embracing the edge of said beam with indicia on opposite sides of said vernier, the two series of indicia on said vernier reading oppositely and each of them cooperating with that one of said scales on said beam reading similarly for indicating the position of said index according to both of said scales, means for adjusting said vernier vertically relative to said index slide, means for clamping said vernier in a selected position in said index slide, and means for moving said index slide and said index carried thereby vertically on said beam.

References Cited in the file of this patent

UNITED STATES PATENTS

| 2,252,146 | Walsh | Aug. 12, 1941 |
| 2,774,146 | McCoy | Dec. 18, 1956 |

FOREIGN PATENTS

| 26,318 | Great Britain | Dec. 2, 1903 |
| 118,593 | Great Britain | Apr. 10, 1919 |
| 83,068 | Switzerland | Apr. 1, 1920 |